United States Patent
Mitsui

(10) Patent No.: US 11,319,429 B2
(45) Date of Patent: May 3, 2022

(54) MASTERBATCH MANUFACTURING METHOD AND TIRE MANUFACTURING METHOD

(71) Applicant: TOYO TIRE CORPORATION, Itami (JP)

(72) Inventor: Akihito Mitsui, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 392 days.

(21) Appl. No.: 16/341,154

(22) PCT Filed: Jul. 11, 2017

(86) PCT No.: PCT/JP2017/025250
§ 371 (c)(1),
(2) Date: Apr. 11, 2019

(87) PCT Pub. No.: WO2018/123114
PCT Pub. Date: Jul. 5, 2018

(65) Prior Publication Data
US 2020/0190291 A1  Jun. 18, 2020

(30) Foreign Application Priority Data
Dec. 27, 2016 (JP) .............................. JP2016-252602

(51) Int. Cl.
| | |
|---|---|
| C08J 3/22 | (2006.01) |
| C08L 7/02 | (2006.01) |
| B60C 1/00 | (2006.01) |
| C08C 1/15 | (2006.01) |
| C08C 3/00 | (2006.01) |
| C08K 3/04 | (2006.01) |
| B29B 7/42 | (2006.01) |
| B29L 30/00 | (2006.01) |

(52) U.S. Cl.
CPC ............... *C08L 7/02* (2013.01); *B60C 1/00* (2013.01); *C08C 1/15* (2013.01); *C08C 3/00* (2013.01); *C08J 3/22* (2013.01); *C08K 3/04* (2013.01); *B29B 7/42* (2013.01); *B29L 2030/00* (2013.01); *C08L 2310/00* (2013.01); *C08L 2312/00* (2013.01)

(58) Field of Classification Search
CPC .... C08L 7/02; C08L 2310/00; C08L 2312/00; C08C 1/15; C08C 3/00; C08J 3/22; C08K 3/04; B60C 1/00
See application file for complete search history.

(56) References Cited

U.S. PATENT DOCUMENTS

| | | |
|---|---|---|
| 2012/0053264 A1 | 3/2012 | Nakayama et al. |
| 2014/0249252 A1 | 9/2014 | Miyasaka |
| 2016/0075836 A1 | 3/2016 | Adler et al. |
| 2016/0114633 A1 | 4/2016 | Miyasaka |
| 2017/0129291 A1 | 5/2017 | Miyasaka |

FOREIGN PATENT DOCUMENTS

| | | |
|---|---|---|
| CN | 105539019 A | 5/2016 |
| DE | 10 2015 220 678 A1 | 4/2016 |
| DE | 11 2015 002 317 T5 | 2/2017 |
| JP | 2010-65126 A | 3/2010 |
| JP | 2010-270200 A | 12/2010 |
| JP | 2011-511148 A | 4/2011 |
| JP | 2013-147574 A | 8/2013 |
| JP | 2016-22618 A | 2/2016 |
| JP | 2016-83814 A | 5/2016 |
| JP | 2016-519196 A | 6/2016 |
| WO | 2009/099623 A1 | 8/2009 |
| WO | 2010/107032 A1 | 9/2010 |
| WO | 2016/009576 A1 | 1/2016 |
| WO | 2016/045960 A1 | 3/2016 |

OTHER PUBLICATIONS

Office Action dated Sep. 28, 2020, issued in counterpart DE Application No. 11 2017 006 591.7, with English translation (7 pages).
Office Action dated Jan. 5, 2021, issued in counterpart JP Application No. 2016-252602, with English translation. (5 pages).
Notification of Transmittal of Translation of the International Preliminary Report on Patentabililty (Form PCT/IB/338) issued in counterpart International Application No. PCT/JP2017/025250 dated Jul. 11, 2019 with Forms PCT/IB/373 and PCT/ISA/237 (6 pages).
International Search Report dated Oct. 10, 2017, issued in counterpart International Application No. PCT/JP2017/025250 (2 pages).
Office Action dated Apr. 8, 2021, issued in counterpart CN Application No. 201780069115.8, with English translation. (14 pages).

*Primary Examiner* — Edward J Cain
(74) *Attorney, Agent, or Firm* — Westerman, Hattori, Daniels & Adrian, LLP

(57) ABSTRACT

A masterbatch manufacturing method in accordance with the present disclosure comprises an operation in which pre-coagulation rubber latex comprising filler is coagulated to obtain a coagulum; an operation in which the coagulum is dewatered; and an operation in which the dewatered coagulum is plasticized as it is dried by means of an extruder; wherein, during the operation in which the dewatered coagulum is plasticized as it is dried, the coagulum comprises a peptizing agent.

9 Claims, 1 Drawing Sheet

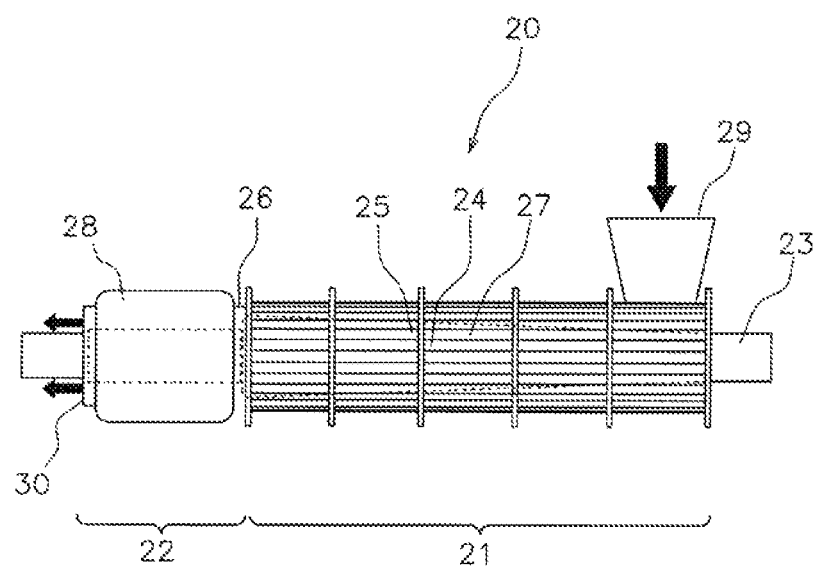

MASTERBATCH MANUFACTURING METHOD AND TIRE MANUFACTURING METHOD

TECHNICAL FIELD

The present disclosure relates to a masterbatch manufacturing method and a tire manufacturing method.

BACKGROUND ART

Wet masterbatch might, for example, be manufactured using a procedure in which a carbon black slurry and natural rubber latex are mixed, this is coagulated, an extruder is used to dewater the coagulum, and plasticization is carried out as this is being dried (hereinafter "conventional procedure").

As compared with dry masterbatch, wet masterbatch manufactured in accordance with such a procedure produces vulcanized rubber having reduced heat generation, but there is a tendency for Mooney viscosity to be high. A dry masterbatch is a masterbatch produced by causing carbon black to be dry-kneaded into rubber.

PRIOR ART REFERENCES

Patent References

PATENT REFERENCE NO. 1: Japanese Patent Application Publication Kokai No. 2013-147574
PATENT REFERENCE NO. 2: International Patent Application Japanese Translation Publication No. 2011-511148
PATENT REFERENCE NO. 3: Japanese Patent Application Publication Kokai No. 2010-65126
PATENT REFERENCE NO. 4: Japanese Patent Application Publication Kokai No. 2016-22618
PATENT REFERENCE NO. 5: Japanese Patent Application Publication Kokai No. 2010-270200

SUMMARY OF INVENTION

Means for Solving Problem

A masterbatch manufacturing method in accordance with the present disclosure comprises an operation in which pre-coagulation rubber latex comprising filler is coagulated to obtain a coagulum; an operation in which the coagulum is dewatered; and an operation in which the dewatered coagulum is plasticized as it is dried by means of an extruder; wherein, during the operation in which the dewatered coagulum is plasticized as it is dried, the coagulum comprises a peptizing agent.

BRIEF DESCRIPTION OF DRAWINGS

FIG. 1 Side view of extruder used at a first embodiment.

EMBODIMENTS FOR CARRYING OUT INVENTION

The present disclosure provides a method for manufacturing a masterbatch capable of reducing Mooney viscosity as compared with that of the conventional procedure. The present disclosure also provides a method for manufacturing a tire.

A masterbatch manufacturing method in accordance with the present disclosure comprises an operation in which pre-coagulation rubber latex comprising filler is coagulated to obtain a coagulum; an operation in which the coagulum is dewatered; and an operation in which the dewatered coagulum is plasticized as it is dried by means of an extruder; wherein, during the operation in which the dewatered coagulum is plasticized as it is dried, the coagulum comprises a peptizing agent.

A masterbatch manufacturing method in accordance with the present disclosure is capable of reducing Mooney viscosity as compared with the conventional procedure. This is because, in accordance with the present disclosure, since, during an operation in which a dewatered coagulum is plasticized as it is dried by means of an extruder, the coagulum comprises a peptizing agent, it is possible for the heating and shearing that take place during this operation to reduce the molecular weight of the rubber and lower the Mooney viscosity.

During the operation in which the coagulum is dewatered, while it is possible for the coagulum to comprise peptizing agent, it is preferred that it not comprise peptizing agent. This is because, where the coagulum comprises peptizing agent during this operation, the peptizing agent will be eluted into the aqueous phase, which will lower the Mooney viscosity reduction effect.

It is preferred during the operation in which the dewatered coagulum is plasticized as it is dried that the peptizing agent be present in an amount that is 0.05 part by mass to 3 parts by mass for every 100 parts by mass of rubber within the coagulum. Below 0.05 part by mass, there tends to be too little benefit in terms of reduction in Mooney viscosity. Above 3 parts by mass, there is a tendency for heat generation of the vulcanized rubber to worsen.

A tire manufacturing method in accordance with the present disclosure comprises the masterbatch manufacturing method in accordance with the present disclosure.

In accordance with the present disclosure, filler refers to carbon black, silica, clay, talc, calcium carbonate, magnesium carbonate, aluminum hydroxide, and/or other such inorganic filler(s) ordinarily used in the rubber industry.

Embodiment 1

The present disclosure will now be described in terms of a first embodiment. The first embodiment employs carbon black as filler.

A masterbatch manufacturing method in accordance with a first embodiment comprises an operation in which carbon black and rubber latex are mixed to obtain a carbon black slurry. Mixing the carbon black and the rubber latex makes it is possible to prevent reflocculation of carbon black. This is thought to be due to formation of an extremely thin latex phase on all or part of the surface of the carbon black, the latex phase inhibiting reflocculation of carbon black. As examples of the carbon black, besides SAF, ISAF, HAF, FEF, GPF, and other such carbon blacks ordinarily used in the rubber industry, acetylene black, Ketchen black, and/or other such electrically conductive carbon blacks may be used. The carbon black may be nongranulated carbon black or may be granulated carbon black that has been granulated based upon considerations related to the handling characteristics thereof as is ordinary practice in the rubber industry. The rubber latex at the operation in which the carbon black slurry is made may for example be natural rubber latex, synthetic rubber latex, and/or the like. The number average molecular weight of natural rubber within the natural rubber latex might, for example, be not less than 2,000,000. The synthetic rubber latex might, for example, be styrene-butadiene rubber latex, butadiene rubber latex, nitrile rubber latex, and/or chloroprene rubber latex. It is preferred that solids (rubber) concentration in the rubber latex be not less than 0.1 mass %, more preferred that this be not less than 0.2 mass %, and still more preferred that this be not less than 0.3 mass %. The upper limit of the range in values for the solids concentration might, for example, be 5 mass %, it being preferred that this be 2 mass %, and it being more preferred that this be 1 mass %. The carbon black and the rubber latex may be mixed using a high-shear mixer, high shear mixer, homomixer, ball mill, bead mill, high-pressure homogenizer, ultrasonic homogenizer, colloid mill, and/or other such ordinary disperser.

In the carbon black slurry, carbon black is dispersed in water. It is preferred that the amount of carbon black in the carbon black slurry be not less than 1 mass %, and more preferred that this be not less than 3 mass %, per 100 mass % of the carbon black slurry. It is preferred that the upper limit of the range in values for the amount of carbon black in the carbon black slurry be 15 mass %, and more preferred that this be 10 mass %.

A masterbatch manufacturing method in accordance with the first embodiment further comprises an operation in which the carbon black slurry and rubber latex are mixed to obtain pre-coagulation rubber latex. The rubber latex for mixture with the carbon black slurry may for example be natural rubber latex, synthetic rubber latex, and/or the like. It is preferred that the solids concentration of the rubber latex for mixture with the carbon black slurry be greater than the solids concentration of the rubber latex at the operation in which the carbon black slurry is made. It is preferred that the solids concentration of the rubber latex for mixture with the carbon black slurry be not less than 10 mass %, and more preferred that this be not less than 20 mass %. The upper limit of the range in values for the solids concentration at the rubber latex might, for example, be 60 mass %, it being preferred that this be 40 mass %, and it being more preferred that this be 30 mass %. The carbon black slurry and the rubber latex may be mixed using a high-shear mixer, high shear mixer, homomixer, ball mill, bead mill, high-pressure homogenizer, ultrasonic homogenizer, colloid mill, and/or other such ordinary disperser.

In the pre-coagulation rubber latex, rubber particles, carbon black, and so forth are dispersed in water. The pre-coagulation rubber latex does not comprise peptizing agent.

A masterbatch manufacturing method in accordance with the first embodiment further comprises an operation in which the pre-coagulation rubber latex is coagulated to obtain a coagulum. Coagulant may be added to the pre-coagulation rubber latex to cause it to coagulate. The coagulant might, for example, be an acid. As the acid, formic acid, sulfuric acid, and the like may be cited as examples. The coagulum obtained by coagulation of the pre-coagulation rubber latex contains water.

A masterbatch manufacturing method in accordance with the first embodiment further comprises an operation in which the coagulum is dewatered using extruder 20 shown in FIG. 1; and an operation in which the dewatered coagulum is plasticized as it is dried by means of extruder 20. It is preferred that water content of the coagulum following dewatering thereof be not greater than 15%, and more preferred that this be not greater than 10 mass %.

Extruder 20 is a single-screw extruder, and is equipped with screw 23 and barrels 27. Barrels 27 comprise first barrel 25 and second barrel 26. Second barrel 26 is located downstream from first barrel 25. First barrel 25 is provided with slits 24. First barrel 25 constitutes dewatering region 21 of extruder 20. Second barrel 26 constitutes drying region 22 of extruder 20. Extruder 20 may further comprise jacket 28. The coagulum which is fed thereinto by way of feed port 29 of first barrel 25 is dewatered by means of compaction and evaporation at dewatering region 21, is plasticized as it is dried at drying region 22, and is discharged therefrom by way of discharge port 30.

Peptizing agent is added to the coagulum during the operation in which the dewatered coagulum is plasticized as it is dried. As peptizing agent, 2,2'-Dibenzamidodiphenyl disulfide (DBD), zinc salts of 2-benzamidothiophenol, xylyl mercaptan, beta-naphthyl mercaptan, pentachlorothiophenol (PCTP), and the like may be cited as examples. Any one of these may be used alone, or any two or more of these may be used in combination. The peptizing agent may be added by means of a belt feeder. It is preferred that water content of the coagulum at the time that the peptizing agent is added thereto be not greater than 15%, and more preferred that this be not greater than 10 mass %.

That is, the coagulum comprises peptizing agent during the operation in which the dewatered coagulum is plasticized as it is dried. It is preferred that the amount of peptizing agent that is present during this operation be not less than 0.05 part by mass for every 100 parts by mass of rubber within the coagulum. Below 0.05 part by mass, there tends to be little benefit in terms of reduction in Mooney viscosity. It is preferred that the upper limit of the range in values for the amount of peptizing agent be 3 parts by mass for every 100 parts by mass of rubber within the coagulum. Above 3 parts by mass, there is a tendency for heat generation to worsen.

A masterbatch manufacturing method in accordance with the first embodiment further comprises an operation in which the plasticized coagulum is molded as necessary to obtain masterbatch.

The masterbatch comprises rubber. The rubber might, for example, be natural rubber, isoprene rubber, butadiene rubber, styrene-butadiene rubber, nitrile rubber, chloroprene rubber, and/or the like. It is preferred that the amount of natural rubber in the masterbatch be not less than 70 mass %, more preferred that this be not less than 80 mass %, still more preferred that this be not less than 90 mass %, and still more preferred that this be 100 mass %, per 100 mass % of the rubber.

The masterbatch further comprises carbon black. For every 100 parts by mass of the rubber, it is preferred that the amount of carbon black be not less than 10 parts by mass, more preferred that this be not less than 20 parts by mass, and still more preferred that this be not less than 30 parts by mass. For every 100 parts by mass of the rubber, it is preferred that the amount of carbon black be not greater than 80 parts by mass, and more preferred that this be not greater than 60 parts by mass.

A tire manufacturing method in accordance with the first embodiment further comprises an operation in which masterbatch and compounding ingredient(s)—and, where necessary, rubber not originating from the masterbatch—are dry-blended in a mixer to obtain a mixture. The compounding ingredient(s) might, for example, be stearic acid, wax, zinc oxide, antioxidant, and/or the like. As examples of the antioxidant, aromatic-amine-type antioxidants, amine-ketone-type antioxidants, monophenol-type antioxidants, bisphenol-type antioxidants, polyphenol-type antioxidants, dithiocarbamate-type antioxidants, thiourea-type antioxidants, and the like may be cited. As rubber not originating from the masterbatch, natural rubber, isoprene rubber, butadiene rubber, styrene-butadiene rubber, nitrile rubber, chloroprene rubber, and the like may be cited as examples. As the mixer, internal mixers, open roll mills, and the like may be cited as examples. As an internal mixer, Banbury mixers, kneaders, and the like may be cited as examples.

A tire manufacturing method in accordance with the first embodiment further comprises an operation in which a vulcanizing-type compounding ingredient is added to the mixture, and in which the vulcanizing-type compounding ingredient is kneaded into the mixture to obtain a rubber composition. As examples of the vulcanizing-type compounding ingredient, sulfur, organic peroxides, and other such vulcanizing agents, vulcanization accelerators, vulcanization accelerator activators, vulcanization retarders, and so forth may be cited. As the sulfur, powdered sulfur, precipitated sulfur, insoluble sulfur, high dispersing sulfur, and the like may be cited as examples. As examples of the vulcanization accelerators, sulfenamide-type vulcanization accelerators, thiuram-type vulcanization accelerators, thiazole-type vulcanization accelerators, thiourea-type vulcanization accelerators, guanidine-type vulcanization accelerators, dithiocarbamate-type vulcanization accelerators, and so forth may be cited.

The rubber composition comprises a rubber component. As the rubber component, natural rubber, isoprene rubber, butadiene rubber, styrene-butadiene rubber, nitrile rubber, chloroprene rubber, and the like may be cited as examples. It is preferred that the amount of natural rubber be not less than 40 mass %, and more preferred that this be not less than 50 mass %, per 100 mass % of the rubber component. The upper limit of the range in values for the amount of natural rubber might, for example, be 100 mass %.

The rubber composition further comprises carbon black. For every 100 parts by mass of the rubber component, it is preferred that the amount of carbon black be not less than 10 parts by mass, more preferred that this be not less than 20 parts by mass, and still more preferred that this be not less than 30 parts by mass. For every 100 parts by mass of the rubber component, it is preferred that the amount of carbon black be not greater than 80 parts by mass, and more preferred that this be not greater than 60 parts by mass.

The rubber composition may further comprise stearic acid, wax, zinc oxide, antioxidant, sulfur, vulcanization accelerator, and/or the like. It is preferred that the amount of the sulfur, expressed as equivalent sulfur content, be 0.5 part by mass to 5 parts by mass for every 100 parts by mass of the rubber component. It is preferred that the amount of the vulcanization accelerator be 0.1 part by mass to 5 parts by mass for every 100 parts by mass of the rubber component.

The rubber composition may be employed in tread(s), sidewall(s), chafer(s), bead filler(s), and other such tire member(s).

A tire manufacturing method in accordance with the first embodiment comprises an operation in which a green tire equipped with a tire member made up of the rubber composition is made. The tire manufacturing method in accordance with the first embodiment further comprises an operation in which the green tire is heated. The tire obtained by the method of the first embodiment may be a pneumatic tire.

A first Variation on the first embodiment will now be described. Whereas the masterbatch manufacturing method in accordance with the first embodiment comprised an operation in which carbon black and rubber latex were mixed to obtain a carbon black slurry, a variation on the first embodiment comprises, instead of that operation, an operation in which carbon black and water are mixed to obtain a carbon black slurry.

A second variation on the first embodiment will now be described. Whereas dewatering, drying, and plasticization of the coagulum take place at extruder 20 in the masterbatch manufacturing method of the first embodiment, in a second variation on the first embodiment a dewatering extruder is used to dewater the coagulum by means of compaction and evaporation, and a drying/plasticizing extruder is used to cause the dewatered coagulum to be plasticized as it is dried.

A third variation on the first embodiment will now be described. Whereas peptizing agent is added to the coagulum during the operation in which the dewatered coagulum is plasticized as it is dried in the masterbatch manufacturing method of the first embodiment, in a third variation on the first embodiment peptizing agent is added to the coagulum during the operation in which the extruder is used to dewater the coagulum.

WORKING EXAMPLES

Working examples in accordance with the present disclosure are described below.

Raw materials and reagents are indicated below.

| | |
|---|---|
| Natural rubber latex (dry rubber content = 31.2%; Mw = 232,000) | Manufactured by Golden Hope |
| Coagulant | Formic acid (reagent-grade 85%) manufactured by Nacalai Tesque, Inc. (diluted to obtain 10% solution and pH adjusted to 1.2 prior to use) |
| Carbon black | "SEAST 3" (N330) manufactured by Tokai Carbon Co., Ltd. |
| Natural rubber | "RSS #3" manufactured in Thailand |
| Zinc oxide | "Zinc Oxide No. 1" manufactured by Mitsui Mining & Smelting Co., Ltd. |
| Stearic acid | "LUNAC S-20" manufactured by Kao Corporation |
| Antioxidant A | "NOCRAC 6C" manufactured by Ouchi Shinko Chemical Industrial Co., Ltd. |
| Antioxidant B | "RD" manufactured by Ouchi Shinko Chemical Industrial Co., Ltd. |
| Peptizing agent | "Noctizer SZ" manufactured by Ouchi Shinko Chemical Industrial Co., Ltd. |
| Peptizing agent | "Noctizer SD" manufactured by Ouchi Shinko Chemical Industrial Co., Ltd. |
| Wax | "OZOACE 0355" manufactured by Nippon Seiro Co., Ltd. |
| Sulfur | "Powdered Sulfur" manufactured by Tsurumi Chemical Industry Co., Ltd. |
| Vulcanization accelerator | "NOCCELER NS-P" manufactured by Ouchi Shinko Chemical Industrial Co., Ltd. |

Preparation of Masterbatch at Working Examples 1 and 3 Through 5

Water was added at 25° C. to natural rubber latex manufactured by Golden Hope in an amount sufficient to adjust solids (rubber) concentration to 25 mass %. Carbon black was added to water and this was agitated to obtain a carbon black slurry. The carbon black slurry was added to the natural rubber latex having the solids (rubber) concentration that was 25 mass % in accordance with TABLE 1, this was agitated, and coagulant was added in an amount sufficient to achieve a pH of 4 to obtain a coagulum. The coagulum was placed in a squeezer-type single-screw dewatering extruder (Model V-02 screw press manufactured by Suehiro EPM Corporation), and dewatering was carried out at 160° C. until water content of the coagulum was not greater than 10 mass % (first dewatering operation). The dewatered coagulum was again placed in the squeezer-type single-screw dewatering extruder, and plasticization was carried out as the coagulum was dried at 160° C. until water content of the coagulum was not greater than 3 mass % to obtain a masterbatch (second dewatering operation). At the second dewatering operation, a belt feeder was used to cause peptizing agent to be fed at constant speed into the squeezer-type single-screw dewatering extruder by way of the feed port thereof.

Preparation of Masterbatch at Working Examples 2 and 6

Except for the fact that peptizing agent was not fed thereinto at the second dewatering operation but peptizing agent was fed thereinto at the first dewatering operation, a masterbatch was prepared using a procedure identical to that at Working Example 1.

Preparation of Masterbatch at Comparative Examples 5 and 6

Except for the fact that peptizing agent was not fed thereinto at the second dewatering operation but peptizing agent was added to the natural rubber latex having the solids (rubber) concentration that was 25 mass %, a masterbatch was prepared using a procedure identical to that at Working Example 1.

Preparation of Masterbatch at Comparative Example 1

Except for the fact that peptizing agent was not fed thereinto, a masterbatch was prepared using a procedure identical to that at Working Example 1.

Preparation of Masterbatch at Comparative Example 2

Carbon black was added to natural rubber in accordance with TABLE 1, and a Model B Banbury mixer manufactured by Kobe Steel, Ltd., was used to carry out kneading to obtain a masterbatch.

Preparation of Masterbatch at Comparative Examples 3 and 4

Carbon black and peptizing agent were added to natural rubber in accordance with TABLE 1, and a Model B Banbury mixer manufactured by Kobe Steel, Ltd., was used to carry out kneading to obtain a masterbatch.

Preparation of Unvulcanized Rubber at the Various Examples

The compounding ingredients except for sulfur and vulcanization accelerator were added to the masterbatch in accordance with TABLE 1, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.

Mooney Viscosity

Using a rotorless Mooney measurement apparatus manufactured by Toyo Seiki in accordance with JIS K 6300, unvulcanized rubber was preheated at 100° C. for 1 minute, following which the rotor was made to rotate, the value of the torque 4 minutes after the start of rotation being recorded in Mooney units. The Mooney viscosities of the respective Examples are shown as indexed relative to a value of 100 for the Mooney viscosity obtained at Comparative Example 1. The smaller the index the lower the Mooney viscosity and the more excellent the workability.

Loss Tangent tan δ

Unvulcanized rubber was vulcanized at 150° C. for 30 min, and the heat generation of the vulcanized rubber was evaluated based on the tan δ thereof in accordance with JIS K-6394. tan δ was determined based on testing performed using an E4000 rheospectrometer manufactured by UBM at 50 Hz, 80° C., and a dynamic strain of 2%. tan δ of the respective Examples are shown as indexed relative to a value of 100 for the tan δ obtained at Comparative Example 1. The lower the index the lower—and thus the better—was the heat generation.

TABLE 1

| | | | | Comparative Examples | | | | | | Working Examples | | | | | |
|---|---|---|---|---|---|---|---|---|---|---|---|---|---|---|---|
| | | | | 1 | 2 | 3 | 4 | 5 | 6 | 1 | 2 | 3 | 4 | 5 | 6 |
| Parts by mass | Preparation of masterbatch (wet) | Mixing operation | Natural rubber latex (solids content) | 100 | — | — | — | 100 | 100 | 100 | 100 | 100 | 100 | 100 | 100 |
| | | | Carbon black | 50 | — | — | — | 50 | 50 | 50 | 50 | 50 | 50 | 50 | 50 |
| | | | Peptizing agent Noctizer SZ | — | — | — | — | 0.1 | — | — | — | — | — | — | — |
| | | | Peptizing agent Noctizer SD | — | — | — | — | — | 0.1 | — | — | — | — | — | — |
| | | First dewatering operation | Peptizing agent Noctizer SZ | — | — | — | — | — | — | — | 0.1 | — | — | — | — |
| | | | Peptizing agent Noctizer SD | — | — | — | — | — | — | — | — | — | — | — | 0.1 |
| | | Second dewatering operation | Peptizing agent Noctizer SZ | — | — | — | — | — | — | 0.1 | — | — | — | — | — |
| | | | Peptizing agent Noctizer SD | — | — | — | — | — | — | — | — | 0.05 | 0.1 | 3 | — |
| | Preparation of masterbatch (dry) | | Natural rubber RSS #3 | — | 100 | 100 | 100 | — | — | — | — | — | — | — | — |
| | | | Carbon black | — | 50 | 50 | 50 | — | — | — | — | — | — | — | — |
| | | | Peptizing agent Noctizer SZ | — | — | 0.1 | — | — | — | — | — | — | — | — | — |
| | | | Peptizing agent Noctizer SD | — | — | — | 0.1 | — | — | — | — | — | — | — | — |

TABLE 1-continued

|  |  |  | Comparative Examples | | | | | | Working Examples | | | | | |
| --- | --- | --- | --- | --- | --- | --- | --- | --- | --- | --- | --- | --- | --- | --- |
|  |  |  | 1 | 2 | 3 | 4 | 5 | 6 | 1 | 2 | 3 | 4 | 5 | 6 |
|  | Preparation of unvulcanized rubber | Masterbatch | 150 | 150 | 150.1 | 150.1 | 150.1 | 150.1 | 150.1 | 150.1 | 150.1 | 150.1 | 153 | 150.1 |
|  |  | Zinc oxide | 3 | 3 | 3 | 3 | 3 | 3 | 3 | 3 | 3 | 3 | 3 | 3 |
|  |  | Stearic acid | 2 | 2 | 2 | 2 | 2 | 2 | 2 | 2 | 2 | 2 | 2 | 2 |
|  |  | Wax | 1 | 1 | 1 | 1 | 1 | 1 | 1 | 1 | 1 | 1 | 1 | 1 |
|  |  | Antioxidant A | 2 | 2 | 2 | 2 | 2 | 2 | 2 | 2 | 2 | 2 | 2 | 2 |
|  |  | Antioxidant B | 1 | 1 | 1 | 1 | 1 | 1 | 1 | 1 | 1 | 1 | 1 | 1 |
|  |  | Sulfur | 2 | 2 | 2 | 2 | 2 | 2 | 2 | 2 | 2 | 2 | 2 | 2 |
|  |  | Vulcanization accelerator | 1 | 1 | 1 | 1 | 1 | 1 | 1 | 1 | 1 | 1 | 1 | 1 |
| Evaluation | Mooney viscosity |  | 100 | 80 | 78 | 75 | 99 | 97 | 87 | 97 | 92 | 80 | 81 | 97 |
|  | tanδ |  | 100 | 106 | 107 | 108 | 100 | 101 | 97 | 99 | 97 | 97 | 99 | 99 |

Preparation of Masterbatch at Working Example 7

Water was added at 25° C. to natural rubber latex manufactured by Golden Hope to obtain a dilute natural rubber latex having a solids (rubber) concentration that was 0.5 mass %, and a natural rubber latex having a solids (rubber) concentration that was 25 mass %. Carbon black was added to dilute natural rubber latex, and an agitator (Flashblend) manufactured by Silverson was used to carry out agitation at 3600 rpm for 30 min to obtain a carbon black slurry. The carbon black slurry was added to the natural rubber latex having the solids (rubber) concentration that was 25 mass % in accordance with TABLE 2, a mixer (SMV-20 Supermixer) manufactured by Kawata Co., Ltd., was used to carry out agitation, and coagulant was added in an amount sufficient to achieve a pH of 4 to obtain a coagulum. The coagulum was placed in a squeezer-type single-screw dewatering extruder (Model V-02 screw press manufactured by Suehiro EPM Corporation), and dewatering was carried out at 160° C. until water content of the coagulum was not greater than 10 mass % (first dewatering operation). The dewatered coagulum was again placed in the squeezer-type single-screw dewatering extruder, and plasticization was carried out as the coagulum was dried at 160° C. until water content of the coagulum was not greater than 3 mass % to obtain a masterbatch (second dewatering operation). At the second dewatering operation, a belt feeder was used to cause peptizing agent to be fed at constant speed into the squeezer-type single-screw dewatering extruder by way of the feed port thereof.

Preparation of Masterbatch at Comparative Example 7

Except for the fact that peptizing agent was not fed thereinto, a masterbatch was prepared using a method identical to that at Working Example 7.

Preparation of Unvulcanized Rubber at the Various Examples

The compounding ingredients except for sulfur and vulcanization accelerator were added to the masterbatch in accordance with TABLE 2, a Model B Banbury mixer manufactured by Kobe Steel, Ltd., was used to carry out kneading, and the rubber mixture was discharged. The rubber mixture was then kneaded together with sulfur and vulcanization accelerator in a Model B Banbury mixer to obtain unvulcanized rubber.

Mooney Viscosity

Using a rotorless Mooney measurement apparatus manufactured by Toyo Seiki in accordance with JIS K 6300, unvulcanized rubber was preheated at 100° C. for 1 minute, following which the rotor was made to rotate, the value of the torque 4 minutes after the start of rotation being recorded in Mooney units. The Mooney viscosity of Working Example 7 is shown as indexed relative to a value of 100 for the Mooney viscosity of Comparative Example 7. The smaller the index the lower the Mooney viscosity and the more excellent the workability.

Loss Tangent tan δ

Unvulcanized rubber was vulcanized at 150° C. for 30 min, and the heat generation of the vulcanized rubber was evaluated based on the tan δ thereof in accordance with JIS K-6394. tan δ was determined based on testing performed using an E4000 rheospectrometer manufactured by UBM at 50 Hz, 80° C., and a dynamic strain of 2%. tan δ of Working Example 7 is shown as indexed relative to a value of 100 for the tan δ obtained at Comparative Example 7. The lower the index the lower—and thus the better—was the heat generation.

TABLE 2

Carbon black slurry was prepared using dilute natural rubber latex.

|  |  |  |  | Comparative Example 7 | Working Example 7 |
| --- | --- | --- | --- | --- | --- |
| Parts by mass | Preparation of masterbatch (wet) | Mixing operation | Natural rubber latex (solids content) | 100 | 100 |
|  |  |  | Carbon black | 50 | 50 |
|  |  | Second dewatering operation | Peptizing agent Noctizer SD | — | 0.1 |
|  | Preparation of unvulcanized rubber |  | Masterbatch | 150 | 150.1 |
|  |  |  | Zinc oxide | 3 | 3 |
|  |  |  | Stearic acid | 2 | 2 |
|  |  |  | Wax | 1 | 1 |
|  |  |  | Antioxidant A | 2 | 2 |

TABLE 2-continued

Carbon black slurry was prepared using dilute natural rubber latex.

|  |  |  | Comparative Example 7 | Working Example 7 |
|---|---|---|---|---|
|  |  | Antioxidant B | 1 | 1 |
|  |  | Sulfur | 2 | 2 |
|  |  | Vulcanization accelerator | 1 | 1 |
| Evaluation | Mooney viscosity |  | 100 | 80 |
|  | tanδ |  | 100 | 95 |

Addition of peptizing agent at the second dewatering operation resulted in a lowering of Mooney viscosity. For example, addition of 0.05 part by mass of peptizing agent at the second dewatering operation resulted in a lowering of Mooney viscosity by 8 points (see Comparative Example 1 and Working Example 3). Addition of 0.1 part by mass of peptizing agent at the second dewatering operation resulted in a lowering of Mooney viscosity by 20 points (see Comparative Example 1 and Working Example 4). Addition of 3 parts by mass of peptizing agent at the second dewatering operation resulted in a lowering of Mooney viscosity by 19 points (see Comparative Example 1 and Working Example 5).

Addition of peptizing agent at the first dewatering operation also resulted in a lowering of Mooney viscosity. Addition of 0.1 part by mass of peptizing agent at the first dewatering operation resulted in a lowering of Mooney viscosity by 3 points (see Comparative Example 1 and Working Example 6).

The invention claimed is:

1. A masterbatch manufacturing method comprising:
    an operation in which pre-coagulation rubber latex comprising filler is coagulated to obtain a coagulum;
    an operation in which the coagulum is dewatered; and
    an operation in which the dewatered coagulum is plasticized as it is dried by means of an extruder;
    wherein, during the operation in which the dewatered coagulum is plasticized as it is dried, the coagulum comprises a peptizing agent, and the peptizing agent is added to the coagulum during at least one operation selected from among the group consisting of the operation in which the coagulum is dewatered and the operation in which the dewatered coagulum is plasticized as it is dried.

2. The masterbatch manufacturing method according to claim 1 wherein, during the operation in which the dewatered coagulum is plasticized as it is dried, the peptizing agent is present in an amount that is 0.05 part by mass to 3 parts by mass for every 100 parts by mass of rubber within the coagulum.

3. A tire manufacturing method comprising:
    an operation in which the masterbatch manufacturing method according to claim 1 is used to prepare a masterbatch;
    an operation in which at least the masterbatch and compounding ingredients are dry-mixed to obtain a mixture;
    an operation in which at least a vulcanizing-type compounding ingredient is kneaded into the mixture to obtain a rubber composition; and
    an operation in which a green tire equipped with a tire member made up of the rubber composition is made.

4. The masterbatch manufacturing method according to claim 1 wherein the peptizing agent is added to the coagulum during the operation in which the coagulum is dewatered.

5. The masterbatch manufacturing method according to claim 1 wherein the peptizing agent is added to the coagulum during the operation in which the dewatered coagulum is plasticized as it is dried.

6. The masterbatch manufacturing method according to claim 1 wherein the filler comprises carbon black.

7. The masterbatch manufacturing method according to claim 1 further comprising:
    an operation in which a carbon black slurry and rubber latex are mixed to prepare the pre-coagulation rubber latex;
    wherein the filler comprises carbon black.

8. The masterbatch manufacturing method according to claim 7 wherein the rubber latex is natural rubber latex.

9. The masterbatch manufacturing method according to claim 1 wherein the extruder is used to dewater the coagulum during the operation in which the coagulum is dewatered.

* * * * *